United States Patent [11] 3,536,024

| [72] | Inventors | Boris Andreevich Bugaenko |
| | | Prospekt Lenina 30, kv. 32, and |
| | | Vasily Dmitrievich Koltygo, Prospekt |
| | | Lenina 30, kv. 30 both of Nikolaev, U.S.S.R. |
| [21] | Appl. No. | 787,406 |
| [22] | Filed | Dec. 27, 1968 |
| [45] | Patented | Oct. 27, 1970 |

[54] ANCHOR CHAIN ARRESTER
3 Claims, 4 Drawing Figs.

| [52] | U.S. Cl. | 114/200 |
| [51] | Int. Cl. | B63b 21/18 |
| [50] | Field of Search | 114/200 |

[56] References Cited
UNITED STATES PATENTS
3,289,626  12/1966  Petrie et al.

*Primary Examiner*—Andrew H. Farrell
*Attorney*—Waters, Roditi, Schwartz and Nissen ABSTRACT: An anchor chain arrester with a stop, articulated to a lever, rigidly secured to a shaft, fixed relative to the arrester casing by means of a jaw clutch, said shaft being made hollow and provided with internal guides for a nut, interacting with a screw, installed on longitudinal guides of the arrester casing and operatively connected to a movable half-clutch, mounted on said shaft.

ANCHOR CHAIN ARRESTER

The present invention relates to marine deck machinery, and more particularly, it relates to arresters, intended for locking a chain.

Most effectively the present invention can be used in the vessels, where the deck machinery is remotely controlled.

Known in the prior art are anchor chain arresters, whose casing is provided with vertical eyes. The eyes accommodate a shaft, rigidly connected to a lever. The end of the lever is articulated to a stop, interacting with the chain. The anchor chain is locked by fixing the shaft relative to the arrester casing by means of a jaw clutch.

An extremely complicated control system hampers considerably the maintenance of this type of arresters in the vessels, having remote control of deck machinery.

An object of the present invention is to develop an anchor chain arrester, which would be relatively simple in design and would allow to employ a relatively simple remote control system.

In order that this object be achieved an anchor chain arrester is proposed, wherein there is a stop, articulated to a lever rigidly secured to a shaft, which is fixed in place relative to the arrester casing by means of a jaw clutch. According to the present invention, said shaft is made hollow and is provided with internal longitudinal guides for a nut, interacting with a screw, installed on longitudinal guides of the arrester casing and operatively connected to a movable half-clutch of the jaw clutch, mounted on said shaft.

In the exemplary embodiment of the arrester, according to the present invention, the operative connection of the screw with the movable half-clutch is ensured by means of a piston rod of a single-acting hydraulic cylinder, said rod being located in said hollow shaft, the movable half-clutch being rigidly connected to the rod, while the screw is made hollow to allow the rod to pass through, said rod having a stop for the screw, located on the side opposite to the hydraulic cylinder.

It is expedient to connect the lever to the stop additionally by means of a resilient member.

An essential advantage of the present invention lies in that a reliable remote control for the arrester is ensured, said arrester having a relatively simple design. Given below is an exemplary embodiment of the present invention with reference to the accompanying drawings, wherein.

Figure 1:
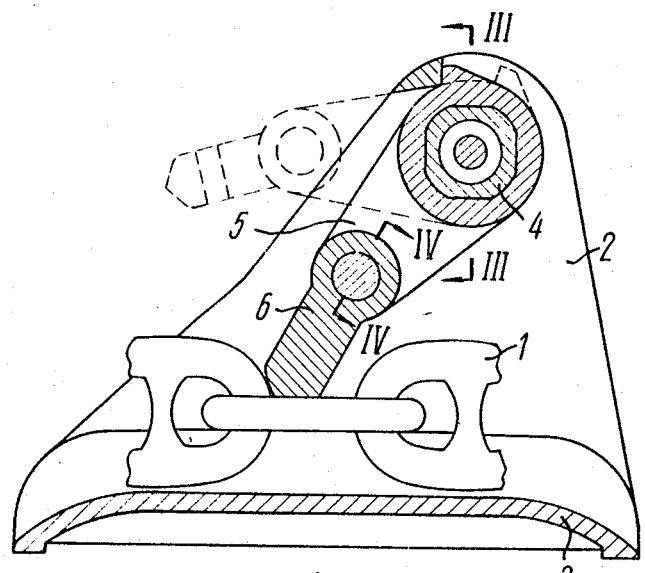
FIG. 1 shows schematically a longitudinal section of the anchor chain arrester according to the invention.
Figure 2:
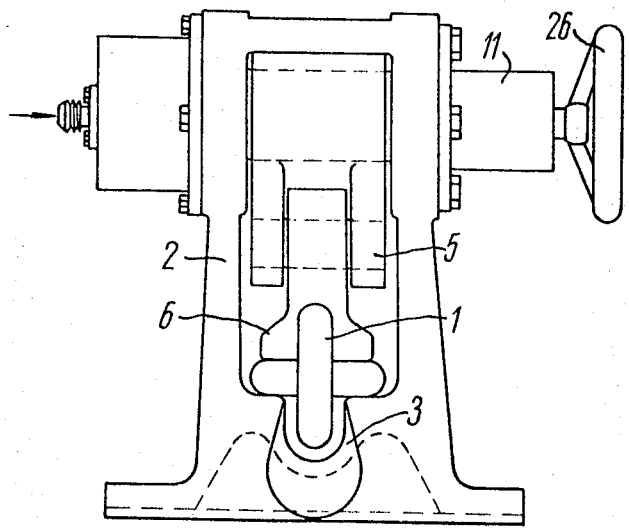
FIG. 2 shows a front view of the arrester.
Figure 3:
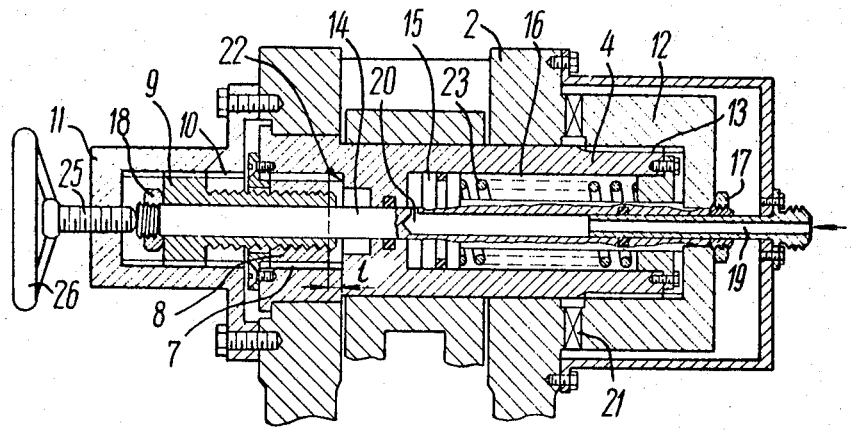
FIG. 3 shows a section, taken along the line III–III of FIG. 1.

The anchor chain arrester 1 (FIG. 1) has eyes 2 (FIG. 2), which are a part of the arrester casing 3. A hollow shaft 4 (FIG. 1) is installed in the eyes 2, a lever 5 being fitted on said shaft. An end of the lever 5 is articulated to a stop 6, interacting with the anchor chain 1. Located inside the hollow shaft 4 are longitudinal guides 7 (FIG. 3) for a nut 8, interacting with a screw 9, whose head is installed on longitudinal guides 10, made in a part 11 of the arrester casing 3. The screw 9 is operatively connected to a movable jaw half-clutch 12, connected to the hollow shaft 4 by means of a splined joint 13. The screw 9 is operatively connected to the movable half-clutch 12 by means of a rod 14 of the piston 15 of a hydraulic cylinder 16, located in the hollow shaft 4. Here, the movable half-clutch 12 is rigidly connected to the rod 14 (by means of a splined joint and nut 17). The screw 9 is made hollow to allow the rod 14 to pass through said rod, having a stop nut 18 on the side opposite to the hydraulic cylinder 16.

The working fluid, delivered to a channel 19 through a hole 20 in the wall of the hollow rod 14 passes into the cavity of the hydraulic cylinder 16, owing to which the piston 15 moves to the right and disengages the movable half-clutch 12 from a stationary half-clutch 21, made as a single part with the eye 2 (FIG. 2) of the arrester casing 3. The nut 8 moves simultaneously with the half-clutch 12 (FIG. 3) under the action of the screw 9, connected to the movable rod 14 by means of the stop 18. After the nut 8 has moved through the distance "1", which is somewhat longer than the height of the clutch jaws (part 12, 21). the nut 8 bears against a shoulder 22 of the hollow shaft 4. During the further movement of the rod 14 the translational movement of the screw 9 is transformed to the rotational movement of the nut 8. As the nut 8 is installed in the guides 7 of the hollow shaft 4, this shaft and the lever 5 rigidly connected thereto, are turned together with the nut. Thus conditions are created for the chain 1 to pass freely relative to the stop 6.

When the pressure in the hydraulic cylinder 16 is reduced lower, than the level, determined by the force of a spring 23, the piston 15 and its rod 14 move to the left. In this case the lever 5 and stop 6 turn to the reverse direction, and the chain 1 is locked.

Figure 4:
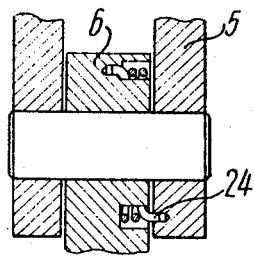
FIG. 4 shows a section, taken along the line IV–IV of FIG. 1.

To ensure higher reliability of locking the chain 1 the stop 6 is additionally connected to the lever 5 by means of a resilient member, that is, a torsion spring 24 (FIG. 4).

This spring determines the constant mutual position of the stop 6 and lever 5 at the moment of contact between the stop 6 and chain 1.

There provided a possibility for manual shifting of the rod 14 by means of a screw 25 (FIG.3), connecting to a handle 26.

An experimental specimen of the anchor chain arrester made in accordance with the present invention, has overall dimensions of 600×800×500 mm. and weighs 250 kg., it is designed for the holding force of 700000 N, when the vessel is anchored and allows to anchor up by means of a mechanized or hand drive when the force is 500000 N.

We claim:

1. An anchor chain arrester, comprising: a casing, a hollow shaft, installed inside said casing; a lever secured on said shaft; a stop, articulated to said lever and interacting with the links of the anchor chain; a nut installed in longitudinal guides, made inside said hollow shaft; a screw installed on longitudinal guides of said arrester casing and interacting with said nut; a jaw clutch whose stationary half-clutch is rigidly connected to said arrester casing, and the movable half-clutch is mounted on said shaft and operatively connected to said screw.

2. An arrester as claimed in claim 1, wherein the screw is operatively connected to the movable half-clutch by means of a piston rod of a single-acting hydraulic cylinder, said rod being located in said hollow shaft, the movable half-clutch being rigidly connected to the rod, and the screw is made hollow to allow the rod to pass through said rod having a stop for the screw, said stop being located on the side, opposite to the hydraulic cylinder.

3. An arrester according to claim 1, wherein the lever and stop are additionally connected by means of a resilient member.